United States Patent
Ishigaki et al.

(10) Patent No.: US 10,746,944 B2
(45) Date of Patent: Aug. 18, 2020

(54) LASER DEVICE

(71) Applicant: Shimadzu Corporation, Kyoto (JP)

(72) Inventors: Naoya Ishigaki, Kyoto (JP); Koji Tojo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/111,304

(22) Filed: Aug. 24, 2018

(65) Prior Publication Data

US 2020/0064566 A1    Feb. 27, 2020

(51) Int. Cl.
*G02B 6/42*    (2006.01)

(52) U.S. Cl.
CPC ......... *G02B 6/4204* (2013.01); *G02B 6/4272* (2013.01)

(58) Field of Classification Search
CPC ............................ G02B 6/4204; G02B 6/4272
See application file for complete search history.

(56) References Cited

U.S. PATENT DOCUMENTS

| | | | | |
|---|---|---|---|---|
| 2006/0018609 A1* | 1/2006 | Sonoda | ................ | G02B 6/4204 385/93 |
| 2011/0096543 A1* | 4/2011 | Yabe | ........................ | H01S 5/005 362/235 |
| 2011/0299700 A1* | 12/2011 | Snider | .................... | H04B 1/082 381/86 |
| 2015/0087180 A1* | 3/2015 | Wu | ........................ | G02B 6/4269 439/485 |
| 2017/0150645 A1* | 5/2017 | Huang | .................... | F25B 21/02 |

FOREIGN PATENT DOCUMENTS

| | | |
|---|---|---|
| JP | H04-257248 A | 9/1992 |
| JP | 3228098 B2 | 5/1997 |
| JP | 2003-022542 A | 1/2003 |
| JP | 2004-119706 A | 4/2004 |
| JP | 2005-190520 A | 7/2005 |
| JP | 2008-149381 A | 7/2008 |
| JP | 2009-141136 A | 6/2009 |
| JP | 2012-009760 A | 1/2012 |
| JP | 2013-138086 A | 7/2013 |

OTHER PUBLICATIONS

Office Action dated Mar. 26, 2019, in corresponding Japanese Application No. 2016-035765; 9 pages.

* cited by examiner

*Primary Examiner* — Chris H Chu
(74) *Attorney, Agent, or Firm* — Maier & Maier, PLLC

(57) ABSTRACT

A laser device includes: a plurality of collimating lenses collimate light emitted from the plurality of light sources; a plurality of holders each hold a pair of light sources and the collimating lens and which adjust emission positions and emission angles of the collimated light of the collimating lenses; a housing which holds the plurality of holders; a light condensing part which condenses each of the collimated light whose emission position and emission angle are adjusted; a heat exhausting member which exhausts heat generated from the plurality of light sources; and a heat transfer member which is disposed between the heat exhausting surfaces of the light sources and a heat absorbing surface of the heat exhausting member, includes an elastic part abutting against the heat exhausting surfaces and the heat absorbing surface, has heat conductivity, and transfers the heat from the heat exhausting surfaces to the heat absorbing surface.

2 Claims, 5 Drawing Sheets

(a)  (b)

LASER DEVICE

FIELD

The present invention relates to a laser device for coupling light from a plurality of light sources and outputting the coupled light to an optical fiber.

BACKGROUND

In a light-emitting device described in Patent Literature 1, light obtained by coupling light from a plurality of light sources is incident to a light-receiving device such as an optical fiber and thus a high output is obtained. In such a light-emitting device, light emitting diodes (LED), semiconductor lasers, or the like are used as light sources, and the light from the light sources is coupled using a lens or a prism.

[Patent Literature 1] Japanese Patent No. 3228098

SUMMARY

However, in a case of coupling the light from the plurality of light sources to obtain a high output while improving the light condensing property and achieving a high luminance, it is required to improve the accuracy for adjusting a beam diameter and an emission direction of the collimated light generated from each light source. Therefore, for each light source, the lenses need to be adjusted.

In this case, positions of an optical fiber to which the light is incident and a lens which condenses the light onto a core part of the optical fiber are fixed first, and in a case of slightly adjusting an incident state of the light to the lens for each light source, the light sources are not located on an identical plane. Therefore, it is difficult to exhaust heat by bringing heat exhausting surfaces of the light sources into contact with one large heat sink.

In a case where a gap generated between the heat exhausting surface of each light source and the heat sink is filled with high heat conductive grease or adhesive, the grease or adhesive has a lower heat conductivity than that of a metal material such as copper and aluminum. In addition, there is a possibility that assembly operation of each light source becomes complex and outgas generated from the light sources is problematic.

An object of the invention is to provide a laser device that can efficiently exhaust heat of a plurality of light sources whose angles are adjusted individually.

Solution to Problem

In order to solve the above problem, a laser device according to the invention includes: a plurality of light sources; a plurality of collimating lenses which are provided to correspond to the plurality of light sources and which collimate light emitted from the plurality of light sources; a plurality of holders which are provided to correspond to the plurality of collimating lenses which each hold a pair of the light source and the collimating lens, and which adjust emission positions and emission angles of the collimated light of the collimating lenses; a housing which holds the plurality of holders; a light condensing part which condenses each of the collimated light whose emission position and emission angle are adjusted; a heat exhausting member which exhausts heat generated from the plurality of light sources; and a heat transfer member which is disposed between the heat exhausting surfaces of the light sources and a heat absorbing surface of the heat exhausting member, includes an elastic part abutting against the heat exhausting surfaces and the heat absorbing surface, has heat conductivity, and transfers the heat from the heat exhausting surfaces to the heat absorbing surface.

According to the invention, since the heat exhausting surfaces of the light sources and the heat absorbing surface of the heat exhausting member are in close contact with each other due to the elastic part of the heat transfer member, uneven gaps between the heat exhausting surfaces of the light sources and the heat absorbing surface of the heat exhausting member can be absorbed. Therefore, since the heat can be easily transferred from the heat exhausting surfaces to the heat absorbing surface by the heat transfer member, the heat of the plurality of light sources whose angles are adjusted individually can be efficiently exhausted.

DETAILED DESCRIPTION

Hereinafter, embodiments of a laser device according to the invention will now be described in details with reference to the accompanying drawings.

First Embodiment

Figure 1:
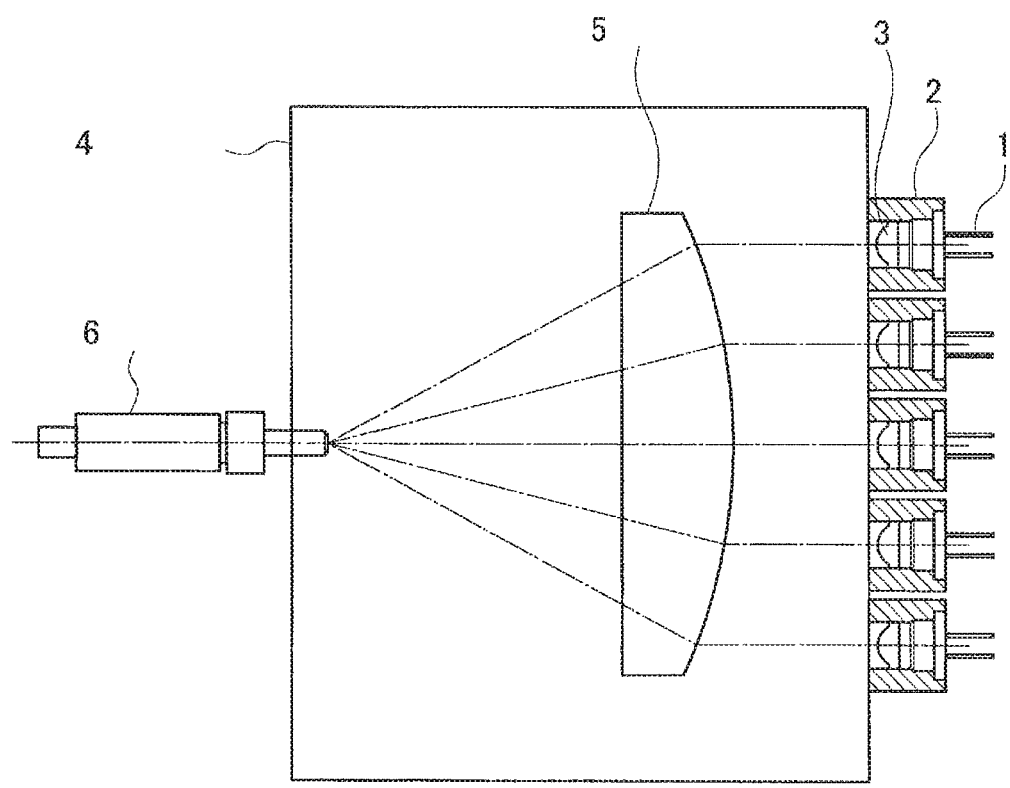
FIG. 1 is a schematic configuration diagram of a laser device according to a first embodiment of the invention.

FIG. 1 is a schematic configuration diagram of a laser device according to a first embodiment of the invention. The laser device as illustrated in FIG. 1 includes a plurality of light sources 1, a plurality of holders 2, a plurality of collimating lenses 3, a housing 4, a condensing lens 5, and an optical fiber 6.

The plurality of light sources 1 include, for example, light emitting diodes (LED), laser diodes (LD), or the like, and the light sources 1 are disposed at substantially equal intervals. In the example of FIG. 1, the number of light sources 1 is five, but the number of light sources is not limited to five, and the number of light sources 1 may be another number.

The plurality of collimating lenses 3 are provided to correspond to the plurality of light sources 1, disposed at positions facing the plurality of light sources 1, and collimate light emitted from the plurality of light sources 1.

The plurality of holders 2 are provided to correspond to the plurality of collimating lenses 3, and each holder 2 is formed of a resin or the like. Each holder 2 holds a pair of the light source 1 and the collimating lens 3 and includes an optical axis adjusting mechanism for adjusting an emission position and an emission angle of the collimated light of the collimating lens 3.

The housing 4 holds the plurality of holders 2, and is formed of a resin or the like. In the housing 4, the condensing lens 5 is disposed at a position corresponding to the plurality of collimating lenses 3.

The condensing lens 5 corresponds to a light condensing part of the invention. The condensing lens 5 condenses the light which is emitted from the collimating lenses 3 whose emission position and emission angle are adjusted, and couples the condensed light to the optical fiber 6. The optical fiber 6 transmits the light condensed by the condensing lens 5.

Figure 2:
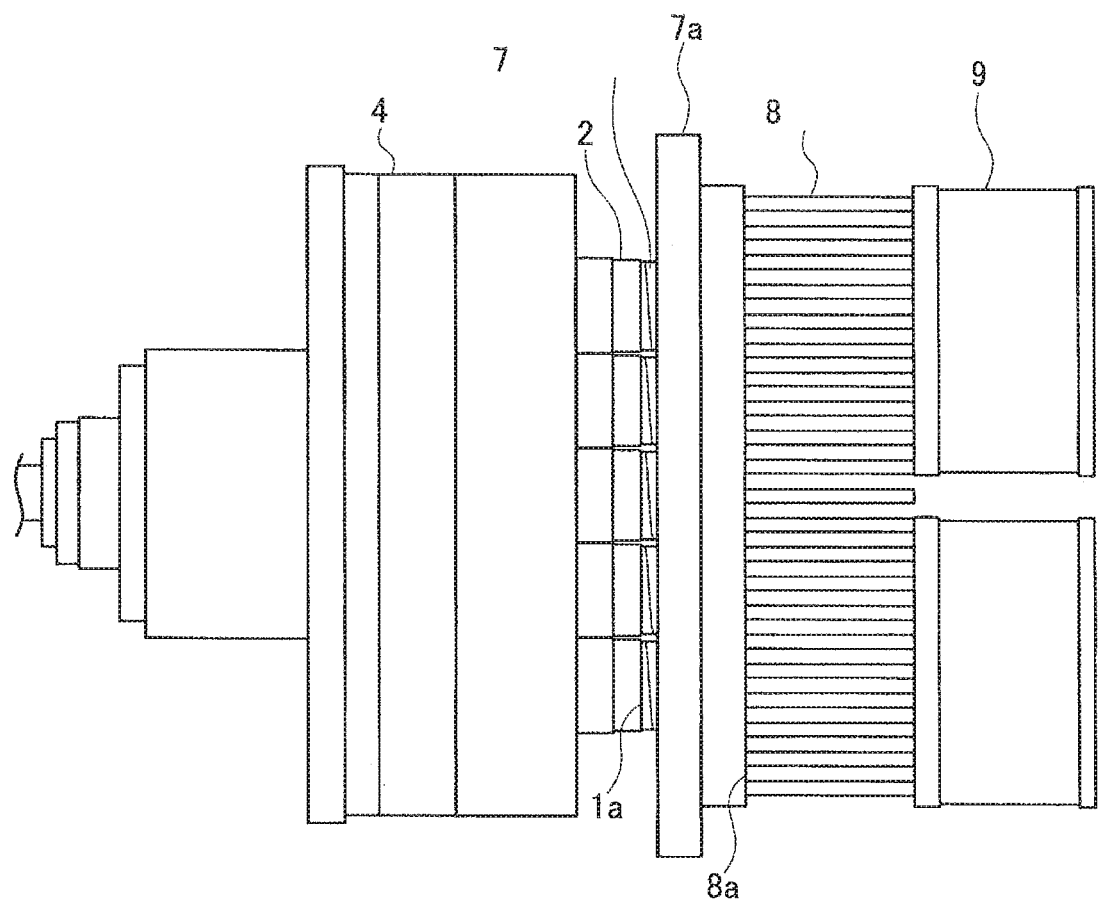
FIG. 2 is a diagram illustrating the laser device according to the first embodiment, in which a heat sink is attached to a housing via coil springs and a heat transfer member.

FIG. 2 illustrates the laser device according to the first embodiment, in which a heat sink 8 is attached to the housing 4 via coil springs 7 and a heat transfer member 7a.

In FIG. 2, the holders 2 protrude from a tip end of the housing 4, and the coil springs 7 are attached to tip ends of the holders 2. The heat transfer member 7a is attached to the coil springs 7, and the heat sink 8 is attached to the heat transfer member 7a. A fan 9 is attached to the heat sink 8.

Figure 3:
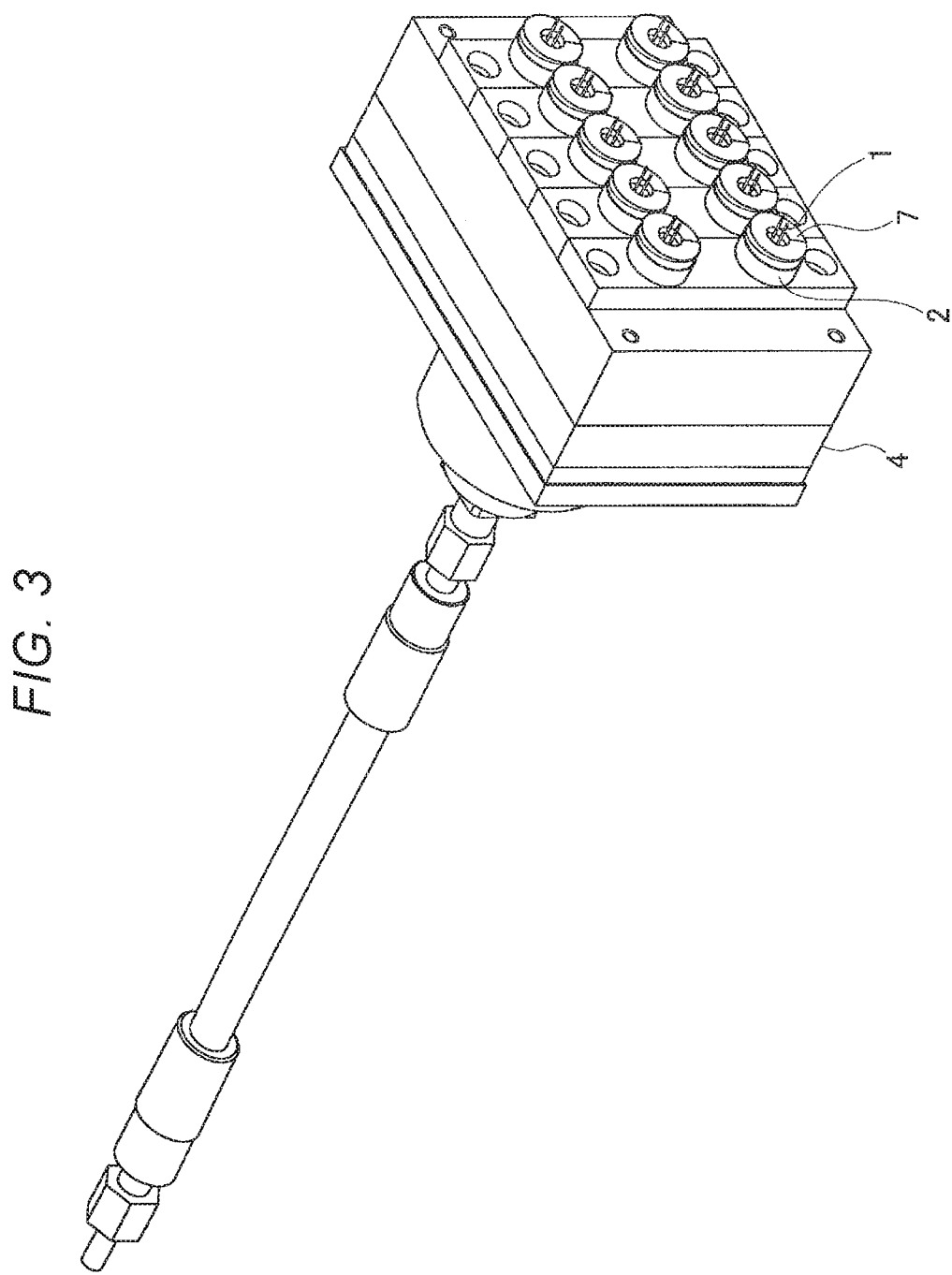
FIG. 3 is a perspective view of the laser device according to the first embodiment, in which the coil springs are attached to holders.

FIG. 3 is a perspective view of the laser device according to the first embodiment, in which the coil springs 7 are attached to the holders 2. The coil springs 7 and the heat transfer member 7a correspond to a heat transfer member of the invention, are disposed between heat exhausting surfaces 1a of the light sources 1 and a heat absorbing surface 8a of the heat sink 8, include an elastic part abutting against the heat exhausting surfaces 1a of the light sources 1 and the heat absorbing surface 8a of the heat sink 8, have heat conductivity, and transfer the heat from the heat exhausting surfaces 1a of each the sources 1 to the heat absorbing surface 8a of the heat sink 8.

The larger a contact area between the heat exhausting surfaces 1a and the heat absorbing surface 8a is, the higher the heat transfer efficiency is. Therefore, close contact or a similar shape thereto is desirable.

Figure 4:
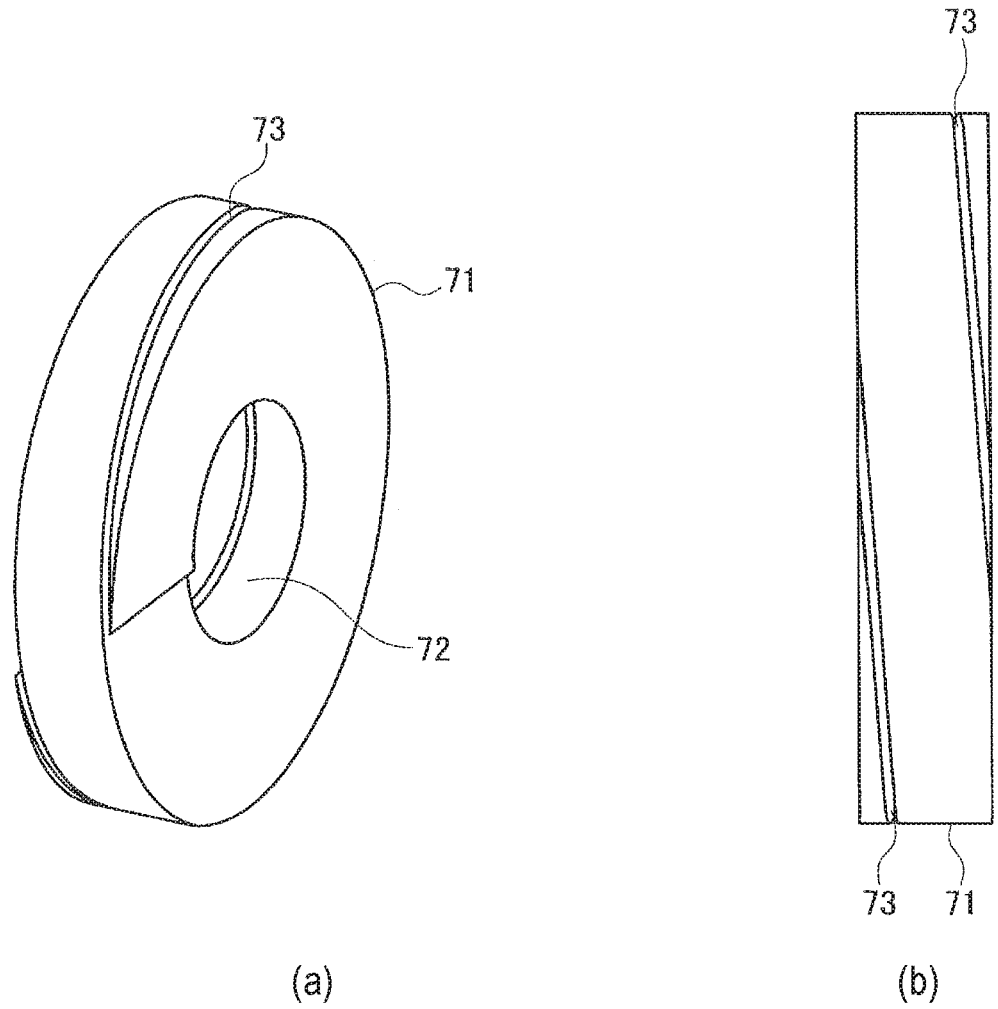
FIG. 4 is a detailed configuration diagram of the coil spring of the laser device according to the first embodiment of the invention.

The coil spring 7 is formed of any one of copper, a copper alloy, aluminum, an aluminum alloy, and aluminum nitride, and has elasticity. As illustrated in FIG. 4, both end surfaces of the coil spring 7 are planarized. The coil spring 7 includes a ring part 71 formed with a through hole 72, and groove parts 73 are formed in both end parts of the ring part 71.

The heat sink 8 corresponds to a heat exhausting member of the invention, and exhausts heat generated from the plurality of light sources 1 via the coil springs 7 and the heat transfer member 7a. The fan 9 cools the heat sink 8. Instead of the fan 9, a water cooling system may be used to cool the heat sink 8.

Next, the operation of the laser device of the first embodiment configured as described above will be described. First, an optical axis position and angle of each holder 2 are adjusted such that light condensing points of the light sources 1 coincide with each other.

Since divergence angles and emission directions of the light sources 1 vary, the holders 2 after adjustment are respectively fixed to the housing 4 at different angles. In addition, the heat exhausting surfaces of the light sources 1 or the heat exhausting surfaces of the holders 2 holding the light sources 1 are at different angles due to the optical axis adjustment.

Therefore, the coil spring 7 and the heat transfer member 7a which have springiness absorb uneven gaps between the heat exhausting surfaces 1a of the light sources 1 or the heat exhausting surfaces of the holders 2 and the heat absorbing surface 8a of the heat sink 8.

As the coil springs 7 and the heat transfer member 7a, a material which has sufficient heat conductivity for heat exhausting and elasticity to be able to absorb a variation of the gaps, such as copper or aluminum, can be used.

Further, since the coil springs 7 and the heat transfer member 7a are planarized, the heat exhausting surfaces 1a of the light sources 1 or the heat exhausting surfaces of the holders 2 and the heat absorbing surface 8a of the heat sink 8 can be in close contact with each other, so that the heat can be easily transferred from the each heat exhausting surface 1a to the heat absorbing surface 8a.

In this way, according to the laser device of the first embodiment, since the heat exhausting surfaces 1a of the light sources 1 and the heat absorbing surface 8a of the heat sink 8 are in closed contact with each other due to the elasticity of the coil springs 7 and heat transfer member 7a, the uneven gaps between the heat exhausting surfaces 1a of the light sources 1 and the heat absorbing surface 8a of the heat sink 8 can be absorbed. Therefore, since the heat can be easily transferred from the heat exhausting surfaces 1a to the heat absorbing surface 8a by the coil springs 7 and the heat transfer member 7a, the heat of the plurality of light sources whose angles are individually adjusted can be efficiently exhausted.

Second Embodiment

Figure 5:
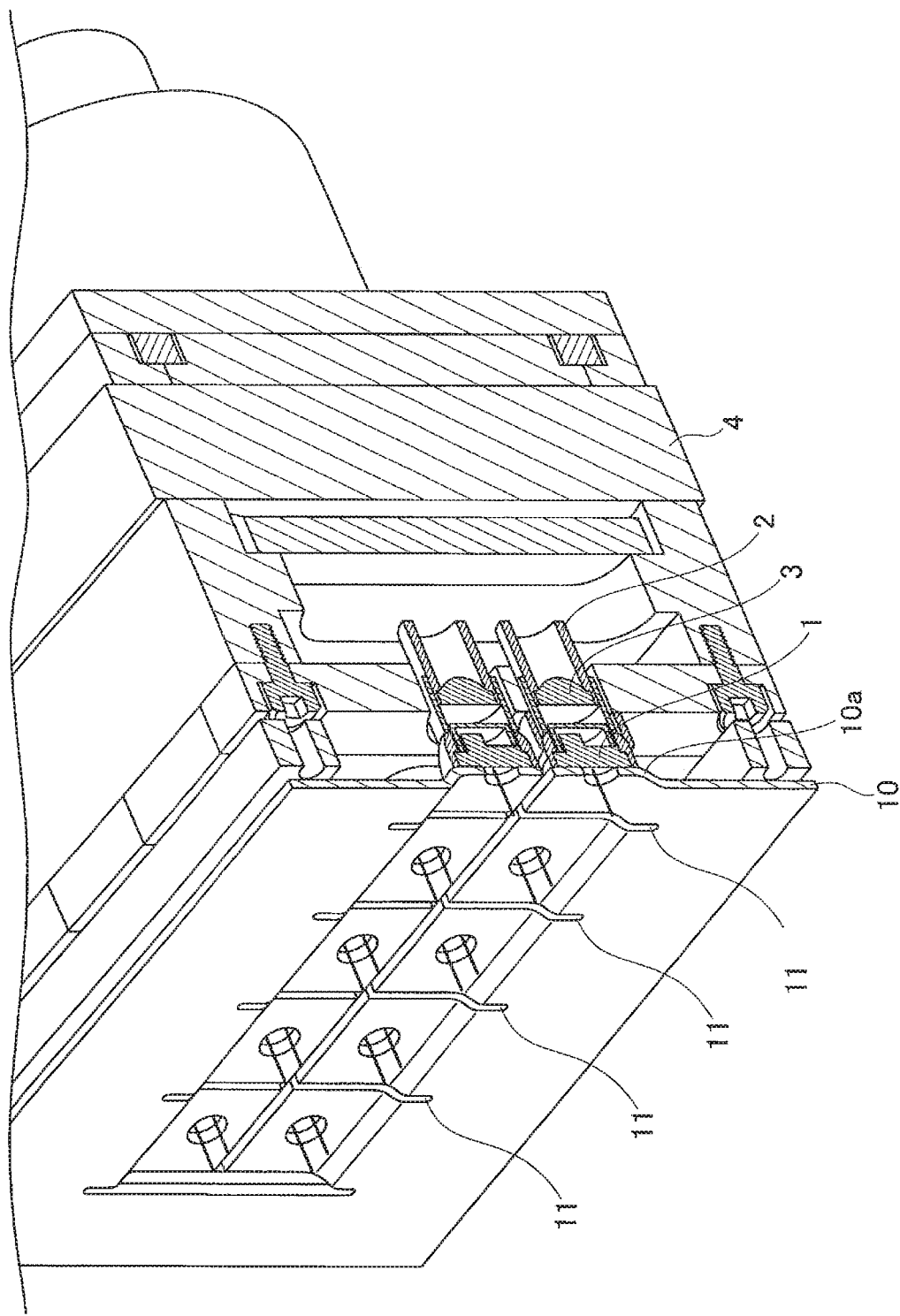
FIG. 5 is a perspective view of a laser device according to a second embodiment, in which a leaf spring is adhered to light sources.

FIG. 5 is a perspective view of a laser device according to a second embodiment, in which a leaf spring is adhered to light sources. In the laser device of the second embodiment, instead of the coil springs 7, a leaf spring 10 is used as a heat transfer member.

The laser device of the second embodiment illustrated in FIG. 5 is the same as the configuration of the laser device of the first embodiment illustrated in FIG. 2 except the leaf spring 10. Herein, the leaf spring 10 will only be described.

As illustrated in FIG. 5, the leaf spring 10 has a flat plate shape, and is disposed so as to cover the light sources 1 and the holders 2. Since the leaf spring 10 has the same characteristics and functions as the coil springs 7 have, description thereof will be omitted herein.

In the leaf spring 10, a recess part 10a is formed at a position facing each light source 1. In this recess part 10a, a circular through hole 10b for passing two leads for positive and negative electrodes of each light source 1 is formed.

In addition, in the leaf spring 10, for each light source, a slit 11 is formed between a heat transfer part corresponding to the light source 1 and a heat transfer part corresponding to another light source 1 adjacent to the light source 1. The slits 11 serve to separate the light sources 1.

The recess parts 10a are formed to reinforce the leaf spring 10, and prevent the leaf spring 10 from becoming weak due to the formation of the slits 11.

In this way, according to the laser device of the second embodiment, since the heat exhausting surfaces 1a of the light sources 1 and the heat absorbing surface 8a of the heat sink 8 are in close contact with each other due to the elasticity of the leaf spring 10 and heat transfer member 7a, the uneven gaps between the heat exhausting surfaces 1a of the light sources 1 and the heat absorbing surface 8a of the heat sink 8 can be absorbed.

Therefore, since the heat can be easily transferred from the heat exhausting surfaces 1a to the heat absorbing surface 8a by the leaf spring 10 and the heat transfer member 7a, the heat of the plurality of light sources whose angles are individually adjusted can be efficiently exhausted.

In addition, since the slit 11 is formed between adjacent light sources, and the light sources 1 are separated from each other by the slits 11, the heat generated from each light source 1 is transferred only to the heat sink 8, and the heat generated from the light source 1 is not transferred to the adjacent light source 1 via the leaf spring 10.

In a case where it is necessary to electrically insulate the light sources 1 and the heat sink 8, a high heat conductive ceramic material such as aluminum nitride may be used as a heat transfer member.

The invention is applicable to laser devices used for analysis, measurement, medical treatment, optical information processing, laser discs, or the like.

The invention claimed is:

1. A laser device comprising:
a plurality of light sources;
a plurality of collimating lenses which are provided to correspond to the plurality of light sources and which collimate light emitted from the plurality of light sources;
a plurality of holders which are provided to correspond to the plurality of collimating lenses which each hold a pair of the light source and the collimating lens, and which adjust emission positions and emission angles of the collimated light of the collimating lenses;
a housing which holds the plurality of holders;
a light condensing part which condenses each of the collimated light whose emission position and emission angle are adjusted;
a heat sink which exhausts heat generated from the plurality of light sources; and
a heat transfer member comprising an elastic part and a heat transfer part, wherein the elastic part is disposed between heat exhausting surfaces of the light sources and the heat transfer part, and wherein the heat transfer part is coupled to a heat absorbing surface of the heat sink, wherein the heat transfer member has heat conductivity, and transfers the heat from the heat exhausting surfaces to the heat absorbing surface, and
wherein the elastic part is a leaf spring having slits disposed therethrough to separate leaf spring sections for each of the plurality of heat exhausting surfaces, absorbing uneven gaps between the heat exhausting surfaces and the heat absorbing surface,
wherein a hole is disposed in each leaf spring section and a light source portion projects through the hole; and
at least one of a fan and a water cooling system attached to the heat sink.

2. The laser device according to claim 1, wherein the heat transfer member is formed of any one of copper, a copper alloy, aluminum, an aluminum alloy, and aluminum nitride.

* * * * *